(12) United States Patent
Kerr et al.

(10) Patent No.: US 8,243,628 B2
(45) Date of Patent: Aug. 14, 2012

(54) FREE MARKET BASED PRICING FOR BANDWIDTH AND NETWORK USAGE

(75) Inventors: Jade Kerr, Kansas City, MO (US); Clinton Smoyer, Raymore, MO (US); Andrew Cook, Lexena, KS (US); Michael Morrissey, Overland Park, KS (US); Mohit Mathur, Olathe, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 837 days.

(21) Appl. No.: 12/363,507

(22) Filed: Jan. 30, 2009

(65) Prior Publication Data

US 2010/0195540 A1    Aug. 5, 2010

(51) Int. Cl.
*H04L 12/16* (2006.01)

(52) U.S. Cl. ........ 370/259; 370/422; 370/237; 370/315; 370/328

(58) Field of Classification Search .................. 370/238, 370/322, 392, 468, 253, 352, 422, 237, 315, 370/328; 709/226; 455/450; 705/37
See application file for complete search history.

(56) References Cited

U.S. PATENT DOCUMENTS

| | | | | |
|---|---|---|---|---|
| 5,048,011 | A * | 9/1991 | Melen | 370/422 |
| 6,055,571 | A | 4/2000 | Fulp et al. | |
| 6,104,701 | A * | 8/2000 | Avargues et al. | 370/238 |
| 6,498,786 | B1 * | 12/2002 | Kirkby et al. | 370/322 |
| 6,842,780 | B1 | 1/2005 | Frei et al. | |
| 7,283,477 | B1 * | 10/2007 | Fedyk et al. | 370/237 |
| 7,760,711 | B1 * | 7/2010 | Kung et al. | 370/352 |
| 7,965,673 | B2 * | 6/2011 | Iwamura | 370/328 |
| 2002/0120745 | A1 * | 8/2002 | Oishi et al. | 709/226 |
| 2005/0159162 | A1 * | 7/2005 | Park | 455/450 |
| 2008/0109343 | A1 * | 5/2008 | Robinson et al. | 705/37 |
| 2008/0267189 | A1 * | 10/2008 | Li | 370/392 |
| 2008/0273553 | A1 * | 11/2008 | Wang et al. | 370/468 |
| 2009/0147722 | A1 * | 6/2009 | Ramachandran | 370/315 |
| 2010/0080144 | A1 * | 4/2010 | Greenberg et al. | 370/253 |
| 2010/0226254 | A1 * | 9/2010 | Kerr et al. | 370/238 |

FOREIGN PATENT DOCUMENTS

EP    1876766 A1 *   1/2008

* cited by examiner

*Primary Examiner* — Ricky Ngo
*Assistant Examiner* — Parth Patel
(74) *Attorney, Agent, or Firm* — Patton Boggs, LLP (57) ABSTRACT

A system and method for establishing a price for communicating over a communications network may include initiating a bandwidth occupancy query message to at least one network node along a traffic path to which a user is communicating. A highest bandwidth occupancy of the network nodes along the traffic path may be determined. A current price may be computed for a user communicating over the traffic path based on the highest bandwidth occupancy. The user may be notified of the current price for communicating over the traffic path, thereby enabling the user to adjust network usage.

20 Claims, 5 Drawing Sheets

FREE MARKET BASED PRICING FOR BANDWIDTH AND NETWORK USAGE

BACKGROUND

Communications networks, such as the Internet, have historically been built to meet peak bandwidth demands for users. Peak bandwidth demand typically occurs during business hours, as both businesses and consumers utilize bandwidth on communications networks. Developers of communications networks generally pay little attention to economics of developing a communications network. Potential revenue of a communications network is generally less important than providing sufficient bandwidth to handle peak communications to avoid frustrating customers. However, peak bandwidth occupancy is typically limited to a few hours during any given day, while the remainder of the day is significantly below the peak bandwidth occupancy. The end result is that the cost of constructing a communications network to satisfy the peak bandwidth occupancy during a few hours of any given day is difficult to justify. Therefore, an approach to lower peak bandwidth occupancy by encouraging users to send more traffic during less expensive bandwidth occupancy times and less traffic during more expensive bandwidth occupancy times would benefit communications networks service providers and users alike.

SUMMARY

To overcome the economic problems of communications networks, the principles of the present invention provide for establishing capital market supply and demand principles to the communications networks. Bandwidth occupancy may be a parameter that is used to adjust price for users who use bandwidth of a communications network during high or low bandwidth occupancy. As bandwidth occupancy goes down, cost for usage of the communications network goes down. Similarly, as bandwidth occupancy goes up, the cost for usage of the communications network may go up. In determining bandwidth occupancy, a primary network edge node may initiate a query to other network nodes in a circuit or traffic path over which a user may communicate to collect bandwidth occupancy at each node. In one embodiment, a highest bandwidth occupancy along the traffic path may be used to determine a price for usage of the communications network. The bandwidth occupancy may be periodically or aperiodically updated and usage price may vary as a function of the bandwidth occupancy.

One embodiment of a system for establishing a price for communicating over a communications network may include multiple network nodes configured to communicate over the communications network. Each of the network nodes may further be configured to determine bandwidth occupancy along each traffic path to which each of the network nodes are connected. A primary network node configured to (i) initiate a bandwidth occupancy query message to at least one of the network nodes along a traffic path to which a user is communicating; (ii) determine a highest bandwidth occupancy of the network nodes along the traffic path, (iii) compute a current price for a user communicating over the traffic path based on the highest bandwidth occupancy, and (iv) notify the user of the current price for communicating over the traffic path.

One embodiment of a method for establishing a price for communicating over a communications network may include initiating a bandwidth occupancy query message to at least one network node along a traffic path to which a user is communicating. A highest bandwidth occupancy of the network nodes along the traffic path may be determined. A current price may be computed for a user communicating over the traffic path based on the highest bandwidth occupancy. The user may be notified of the current price for communicating over the traffic path.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
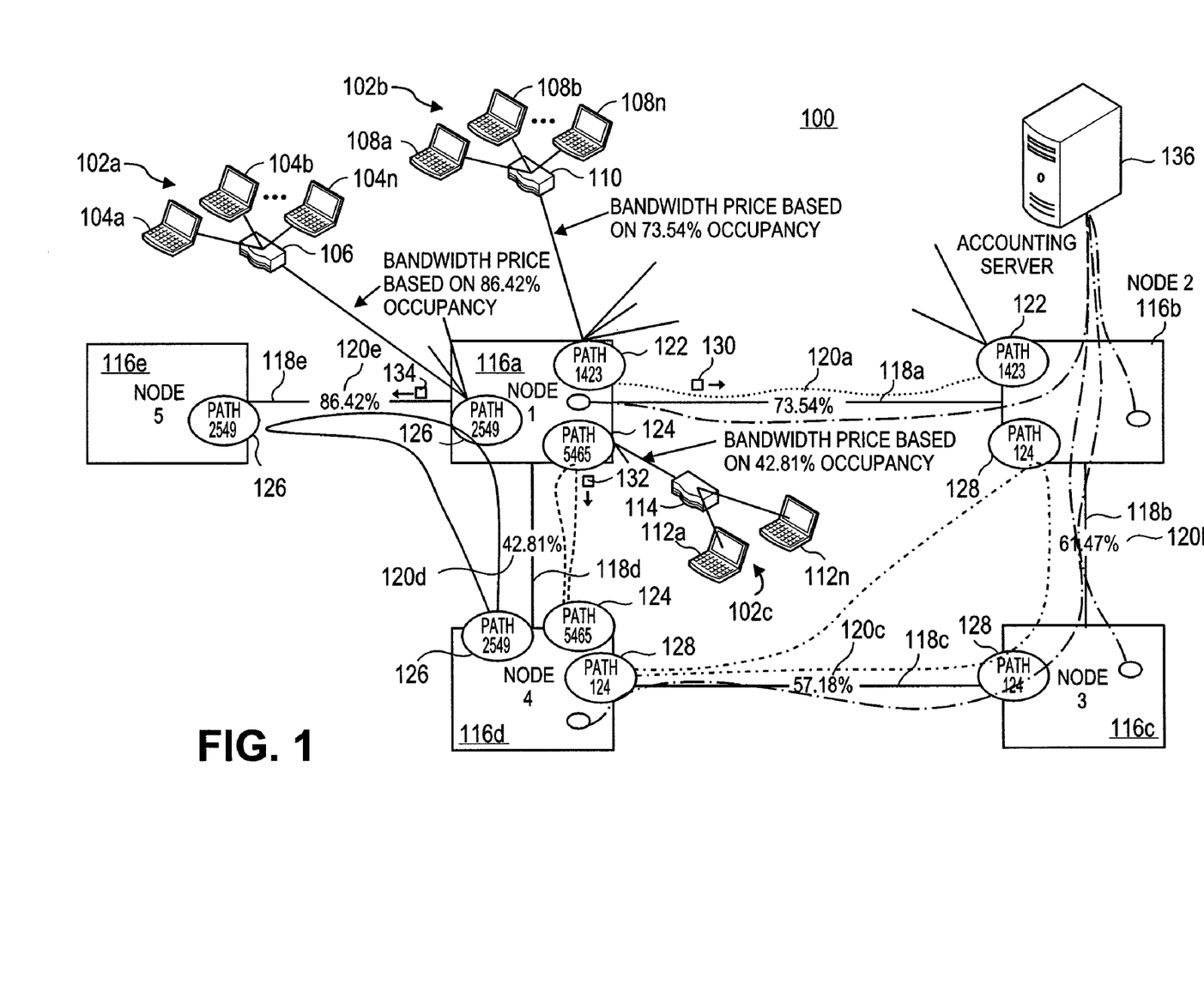
FIG. 1 is an illustration of an illustrative network environment in which supply and demand of bandwidth occupancy are utilized in determining pricing for usage of the communications network.

With regard to FIG. 1, an illustration of an illustrative network environment 100 is shown to include a number of users 102a-102c of the network environment 100. User 102a may include computing devices 104a-104n that interface with the network environment 100 via server 106. User 102b includes computing devices 108a-108n that interfaces with the network environment 100 via server 110. Similarly, user 102c includes computing devices 112a-112n that interface with the network environment 100 via a server 114. Each of the servers 106, 110, and 114 may be considered end-points of the network environment 100.

The network environment 100 illustratively includes five network nodes 116a-116e (collectively 116) that enable the users 102 to communicate with one another and with other users in communication with each of the nodes 116. Each of the nodes 116 are connected via links 118a-118e (collectively 118). Link 118a provides for communications between nodes 116a and 116b, link 118b provides for communications between nodes 116b and 116c, link 118c provides for communications between nodes 116c and 116d, link 118d provides for communications between nodes 116a and 116d, and link 118e provides for communications between nodes 116a and 116e. As shown, each of the links have a bandwidth occupancy 120a-120e, respectively, that is indicative of a percentage of bandwidth of a total bandwidth capacity that is currently being utilized along the links 118. For example, link 118a has a bandwidth occupancy 120a of 73.54%, and link 118d has a bandwidth occupancy 120d of 42.81% that is currently being utilized.

Each of the nodes 116 are shown to be operating or communicating along at least one traffic path with other network nodes 116. For example, node 116a is shown to be communicating along traffic paths 122, 124, and 126, where traffic path 122 includes nodes 116a and 116b, traffic path 124 includes nodes 116a and 116b, and traffic path 126 includes nodes 116a, 116d, and 116e. Another traffic path 128 includes nodes 116b, 116c, and 116d. Each of the traffic paths 122-128 are shown to span across at least one of the links 118. The bandwidth occupancies 120 of each of the links 118 establish bandwidth occupancy for each of the paths 122-128.

According to economic supply and demand principles, higher bandwidth occupancy means that there is less bandwidth supply along a link. Less bandwidth supply typically results in higher prices for use of network resources. As shown in the network environment 100, the bandwidth occupancy 120e at 86.42% is the highest bandwidth occupancy currently being used in the network environment 100. Because user 102a is operating over the traffic path 126 that includes link 118e with the bandwidth occupancy 120e at 86.42%, user 102a will be charged a higher price than users 102b and 102c, who are operating on traffic path 122 and 124, respectively, which both have lower bandwidth occupancy (i.e., 73.54% and 42.81%, respectively).

Each of the users 102 via end-points 106, 110, and 114 initially access network node 116a to access the network environment 100. As such, network node 116a may be considered a primary network node or edge node with respect to each of the users 102 as network node 116a is the edge of the network environment 100 from the point of view of each of the users 102. Being the primary network node for each of the users, the network node 116a may be configured to initiate a bandwidth occupancy query message to each of the other network nodes that are operating in the traffic paths 122, 124, and 126. As shown, network node 116a may communicate (i) bandwidth occupancy query message 130 along traffic path 122, (ii) bandwidth occupancy query message 132 to network node 116d along link 118d for traffic paths 124 and 126, and (iii) bandwidth occupancy query message 134 along link 118e for traffic path 126. The bandwidth occupancy query messages 130, 132, and 134 may be received by other network nodes, thereby causing the network nodes to look up or otherwise determine current bandwidth occupancy at the network node on each respective traffic path. Response messages (not shown) from the other network nodes may be communicated back to the primary network node 116a, as further described herein with respect to FIG. 2.

The primary network node 116a may calculate current prices for each user to communicate over the respective network paths and communicate the current prices to each respective user. The calculation of the current prices may be performed on a periodic basis (e.g., every second) and communicated to the user, thereby enabling the user to adjust network usage as desired. In one embodiment, the pricing information may be communicated to the user on a real time basis. In an alternative embodiment, the servers 106, 110, and 114 may pull current prices from the primary network node 116a as configured by the user (e.g., determine price for network usage every 15 minutes).

An accounting server 136 may be configured to be in communication with the network environment 100. The accounting server may be a centralized server that communicates with one network node, such as network node 116b, to be in communication with every other network node in the network environment 100. Alternatively, rather than utilizing a centralized accounting server, distributed accounting servers may be positioned in the network environment 100. For example, each network node may itself operate as an accounting server by executing a process that performs the same or similar functionality to determine current pricing of each traffic path being utilized by users 102 of the network environment 100. In accordance with the principles of the present invention, the accounting server 136 may be configured to collect network usage by users as determined by the network nodes 116, where the network nodes may continuously or periodically determine network usage and bandwidth occupancy, so as to determine cost for each of the users. The prices for communicating over each traffic path may be different based on the bandwidth occupancy of each respective traffic path. For example, the price for communicating along traffic path 126 may be higher for user 102a than for user 102b communicating over traffic path 122. The price may vary based on time usage, bandwidth usage, or any other parameter (e.g., quality of service (QoS)) that a communications service provider may establish as being marketably price variant as applicable to users.

Figure 2:
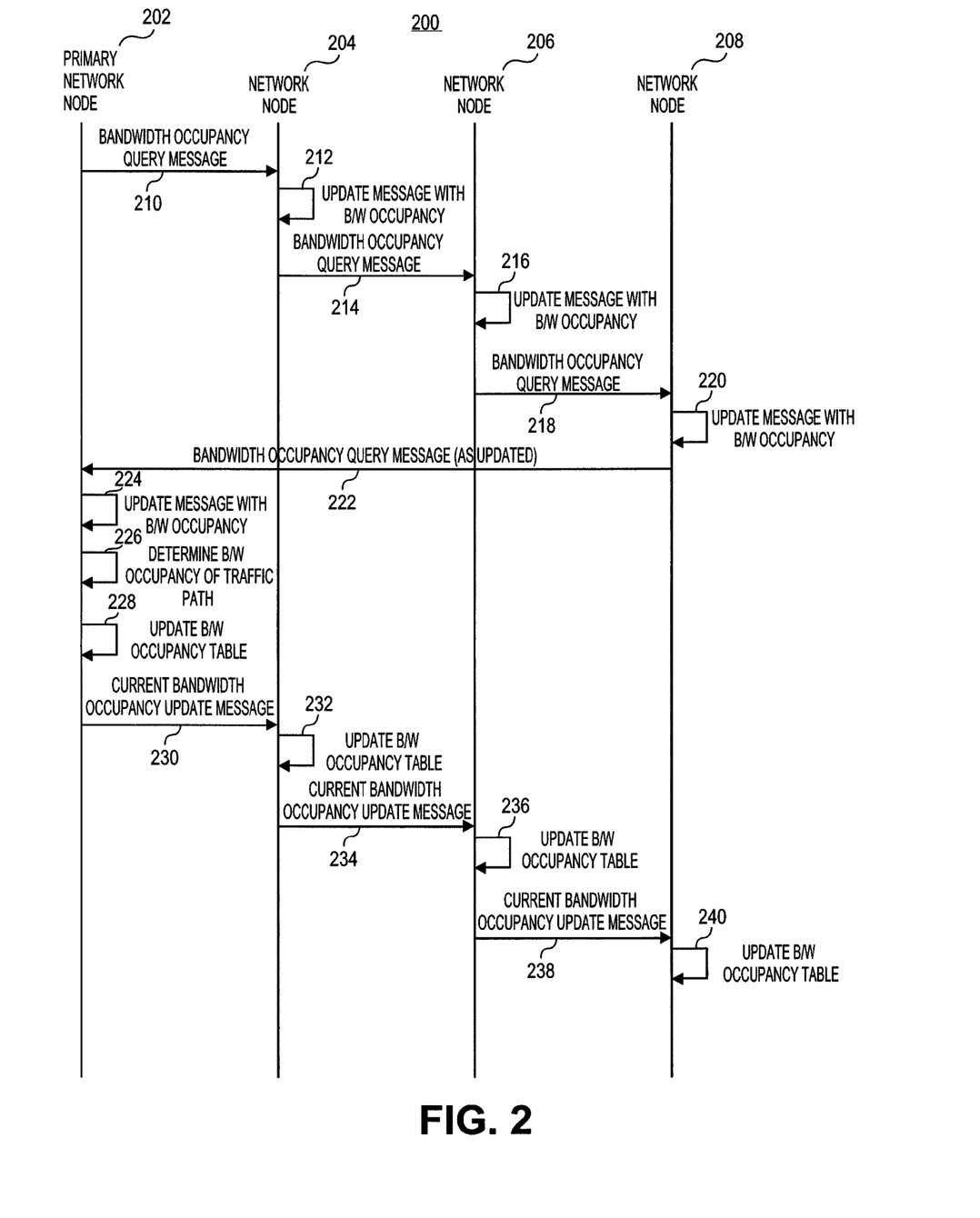
FIG. 2 is a flow diagram of an illustrative process for providing network occupancy communications.

With regard to FIG. 2, a sequence diagram shown in illustrative process 200 for collecting and managing bandwidth occupancy on a network is shown. The process 200 is shown to be performed between a primary network node 202 and other network nodes 204, 206, and 208 of a communications network. The primary network node 202 is an edge node that is generally in direct communication with an end-point of a user or in indirect contact with the end-point, but operates as a primary network node to facilitate communications over the network for the user.

The process 200 starts at step 210, where the primary network node 202 communicates a bandwidth occupancy query message 210 to the network node 204. The bandwidth occupancy query message 210 may request that the network node 204 determine its current bandwidth occupancy along a traffic path. The network node 204 may determine bandwidth occupancy on a port of the network node 204 that is part of the traffic path. At step 212, the network node 204 may update the message with current bandwidth occupancy. In updating the message, a content portion of the message may be updated with the current bandwidth occupancy. In one embodiment, the bandwidth occupancy is expressed as a percentage. At step 214, the network node 204 may communicate the bandwidth occupancy query message as updated to the network node 206, which is next in the traffic path over which a user is communicating. At step 216, the network node 206 updates the message with its bandwidth occupancy if the bandwidth occupancy at network node 206 is higher than the bandwidth occupancy of the network node 204. At step 218, the bandwidth occupancy query message is communicated from the network node 206 to the network node 208, as network node 208 is in the traffic path of the user's communication. At step 220, the network node 208 updates the message with its bandwidth occupancy if the bandwidth occupancy at network node 208 is higher than the bandwidth occupancy of either the network node 204 or network node 206.

At step 222, a bandwidth occupancy query message as updated by the network nodes 204, 206, and 208 is communicated to the primary network node 202 from network node 208. The primary network node 202, in response, determines its bandwidth occupancy and updates the message (i.e., the content of the message) if the bandwidth occupancy at the primary network node 202 is higher than the bandwidth occupancies at the network nodes 204, 206, and 208. At step 226, a determination of the bandwidth occupancy of the traffic path is made. In determining the bandwidth occupancy of the traffic path, the primary network node 202 examines the bandwidth occupancy of the bandwidth occupancy query message that was updated by the primary network node 202 and determines its current value, which is the highest value of each of the network nodes 202, 204, 206, and 208. In an alternative embodiment, rather than replacing the bandwidth occupancy in the bandwidth occupancy query message, each of the network nodes may simply append the bandwidth occupancy at each respective network node so that the bandwidth occupancy at each of the network nodes 202, 204, 206, and 208 are collected by the primary network node 202. In addition, each network node that updates the message may include a node ID or address, thereby enabling a network manager to determine which network nodes have high bandwidth occupancy.

At step 228, the primary network node 202 may update a bandwidth occupancy table. The bandwidth occupancy table may be updated by the bandwidth occupancy determined at step 226 to be associated with the traffic path that includes the network nodes 202, 204, 206, and 208.

TABLE I

| Traffic Path | Path Occupancy | Associated Interfaces | Primary Node |
| --- | --- | --- | --- |
| 122 | 73.54% | 1.1, 2.1, 7.4, 5.6 | 116a |
| 124 | 42.81% | 3.2, 2.5 | 116a |
| 126 | 86.42% | 1.18, 5.1, 3.7 | 116a |

As shown in TABLE I, each traffic path utilizes a highest path bandwidth occupancy to define bandwidth occupancy along a given traffic path. The associated interfaces represent interfaces to each of the network nodes. The primary nodes are those to which a user initially communicates. However, it should be understood that the primary nodes may alternatively be nodes that are not first nodes to which the users communicate, but rather nodes that are designated to be established as primary nodes.

Continuing with FIG. 2, at step 230, a current bandwidth occupancy update message is communicated from the primary node 202 to the network node 204. At step 232, the network node 204 may update a bandwidth occupancy table that resides at the network node 204. The bandwidth occupancy table at the network node 204 may be the same or similar to that as shown in TABLE I. At step 234, a current bandwidth occupancy update message is communicated or forwarded from the network node 204 to the network node 206. At step 236, the network node 206 updates a bandwidth occupancy table that resides at network node 206, which may be the same or similar to that configured on network node 204. At step 238, a current bandwidth occupancy update message may be communicated from the network node 206 to the network node 208, which, in turn, may update a bandwidth occupancy table at step 240 that resides on the network node 208.

Figure 3:
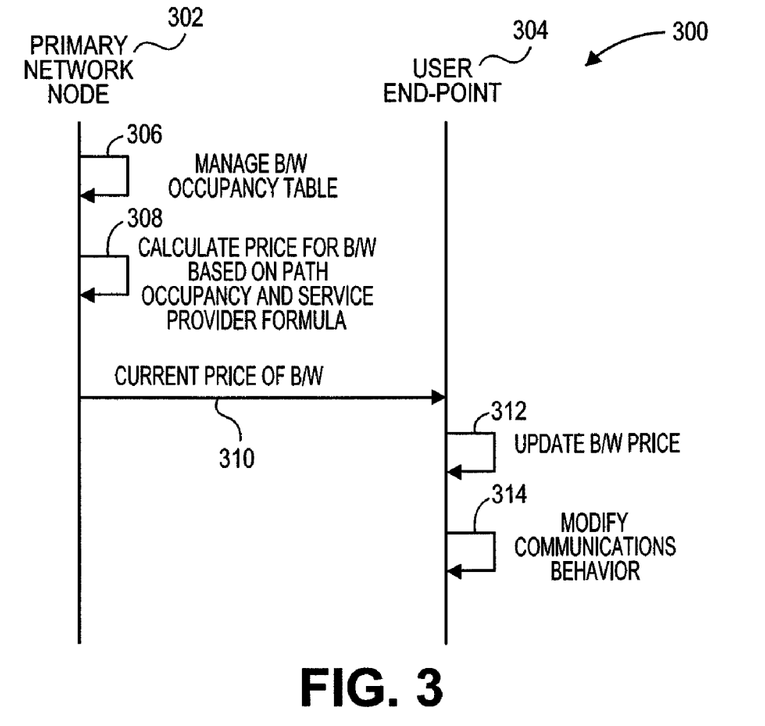
FIG. 3 is a flow diagram of an illustrative process for determining price for bandwidth for a user in accordance with the principles of the present invention.

With regard to FIG. 3, a sequence diagram showing an illustrative process 300 for determining price for bandwidth for a user is provided. The process 300 is shown to be performed by a primary network node 302 in communication with a user end-point 304. The process 300 starts at step 306, where the primary network node 302 is configured to manage a bandwidth occupancy table, such as bandwidth occupancy table shown in TABLE I. At step 308, the primary network node 302 may be configured to calculate a price for bandwidth based on path bandwidth occupancy and a service provider formula for determining price based on bandwidth occupancy. In calculating the price for the bandwidth, the price may be calculated every interval that the bandwidth occupancy is updated in the bandwidth occupancy table. For example, the bandwidth occupancy table may be updated every second or every five seconds and the price may be calculated at that time. Alternatively, the price may be calculated every 60 seconds to reduce processing at the primary network node 302.

At step 310, a current price of bandwidth may be communicated to the user end-point 304. The user end-point 304, in response, may update bandwidth price. In updating the bandwidth price, the user end-point 304 may display an updated price for communicating over a network for the user to view and/or update a software program that manages the user's communication operation over the network. At step 314, the user end-point may modify communications behavior over the network based on the updated bandwidth price. In one embodiment, the user may provision their user end-point 304 to slow down or stop non-real time communications traffic based on a bandwidth price that exceeds a predetermined threshold level (e.g., 75%). Other communications modifications may be performed automatically or semi-automatically based on bandwidth price. For example, a message to a user may automatically be displayed to notify the user of the current bandwidth charges and allow the user to select as to whether to continue with network communications, stop network communications, or slow down network communications. In one embodiment, the system may establish a highest bandwidth occupancy or price threshold at which point the communications may automatically be slowed down or stopped and a message may be communicated or otherwise displayed for a user of the bandwidth pricing and effects that are being implemented to reduce costs. By using supply and demand economics for changing pricing for use of bandwidth over a communications network, users who elect to change their communications during peak periods will reduce peak bandwidth over network nodes with high bandwidth occupancy, thereby reducing network needs to satisfy certain periods of time for peak bandwidth usage.

Figure 4:
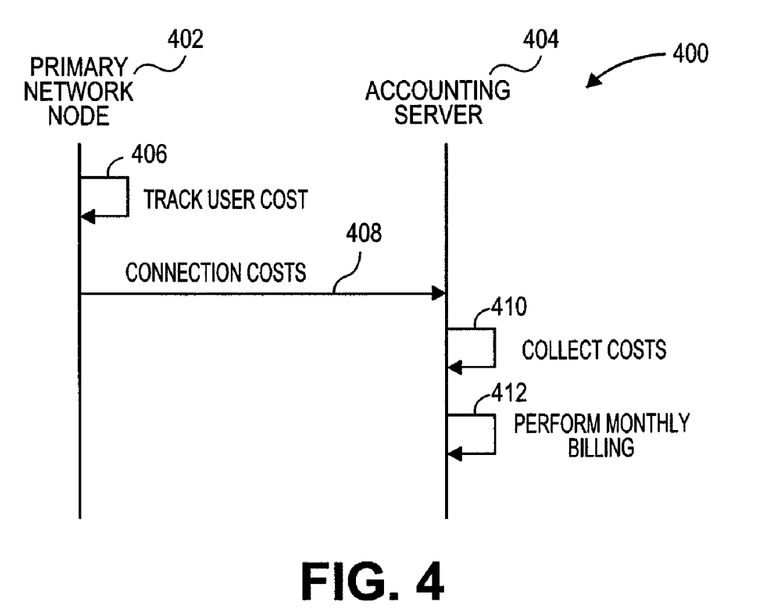
FIG. 4 is a flow diagram of an illustrative process for an accounting server operating on a communications network handling free market bandwidth accounting.

With regard to FIG. 4, a sequence diagram of an illustrative process 400 for billing users for communication over a communications network that uses supply and demand as a function of pricing is shown. A primary network node 402 and accounting server 404 are shown to be utilized in performing billing for network usage. The process 400 starts at step 406, where the primary network node 402 tracks user cost based on bandwidth occupancy. At step 408, the primary network node communicates user connection costs determined by the primary network node 402 to the accounting server 404. The connection costs may be collected by the primary network node 402 over a given time period and communicated to the accounting server 404 for that time period. The accounting server 404 may collect connection costs for each end-point for every user on the network and store the connection costs for billing purposes at step 410. At step 412, the accounting server 404 may perform monthly billing by accessing the collection costs stored for each user connected to each primary network node and issue bills in the form of paper or electronic bills to each user on the network serviced by a telecommunications service provider.

Figure 5:
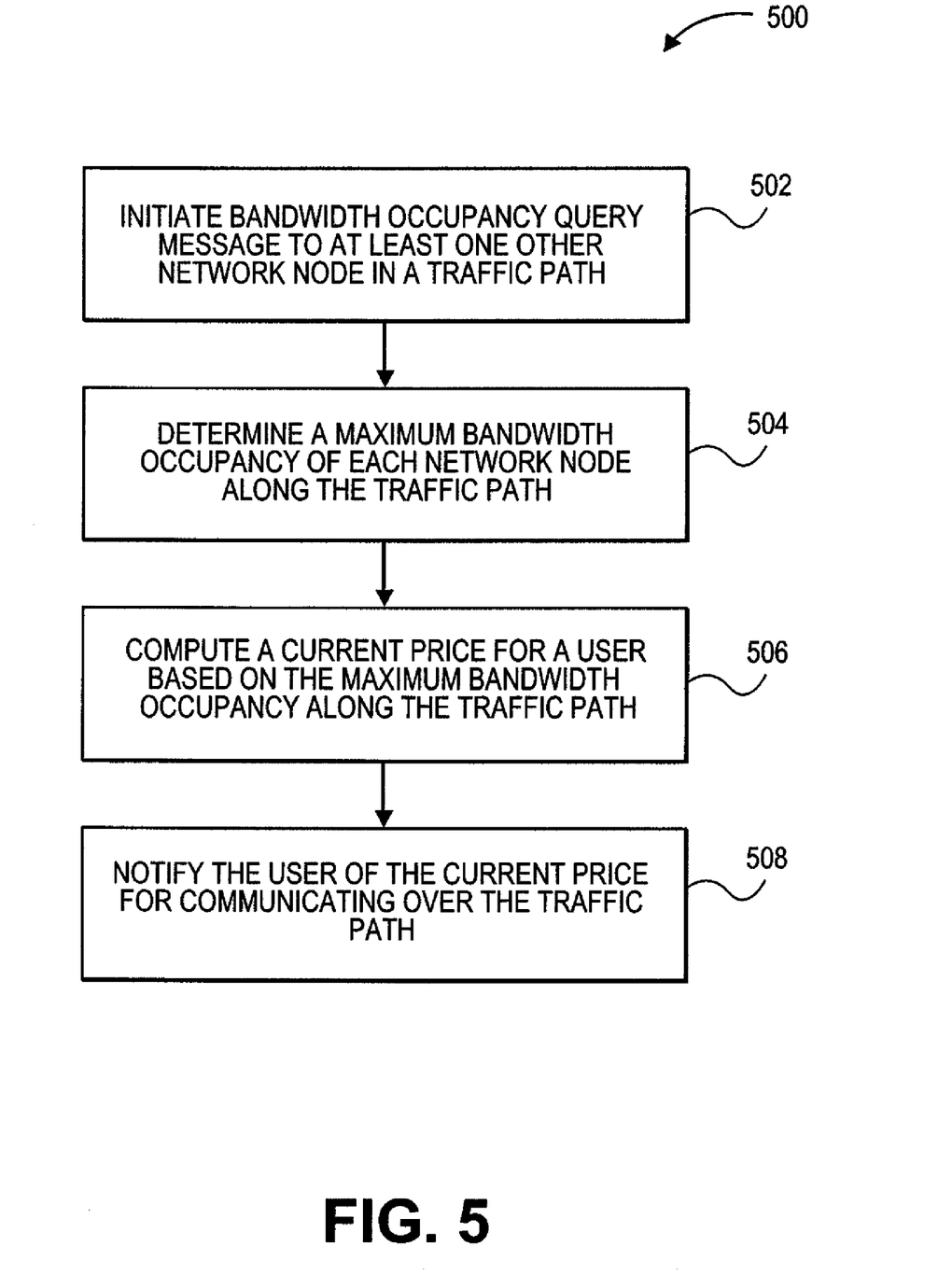
FIG. 5 is a flow diagram of an illustrative process for establishing a price for users communicating over a communications network.

With regard to FIG. 5, a flowchart of an illustrative process 500 for establishing a price for communicating over a communications network is provided. At step 502, a bandwidth occupancy query message may be initiated for communication to at least one other network node in a traffic path. The traffic path may be a communications path over which a user may be communicating information over a communications network, such as the Internet. At step 504, a highest bandwidth occupancy of the network nodes along the traffic path may be determined. In one embodiment, the determination may be made by receiving bandwidth occupancy from each of the network nodes along the traffic path and selecting the highest value. Alternatively, a single value may be received from the network nodes, where the single value is the highest bandwidth occupancy as determined by each of the network nodes. At step 506, a current price for a user may be computed based on the highest bandwidth occupancy along the traffic path. The current price is a current price for which the user is being charged to communicate over the traffic path. In one embodiment, the current price is established based on a formula (e.g., current price=(bandwidth occupancy/bandwidth capacity)*network usage rate) provided by a communications service provider of which the user is a customer. At step 508, the user may be notified of the current price for communicating over the traffic path. In one embodiment, notification of the current price may be in the form of dollars for bandwidth usage, current highest bandwidth occupancy, or any other parameter that may assist the user in determining whether to continue communicating over the traffic path or adjust current communications to reduce or increase communications based on the current price for communicating over the traffic path.

Figure 6:
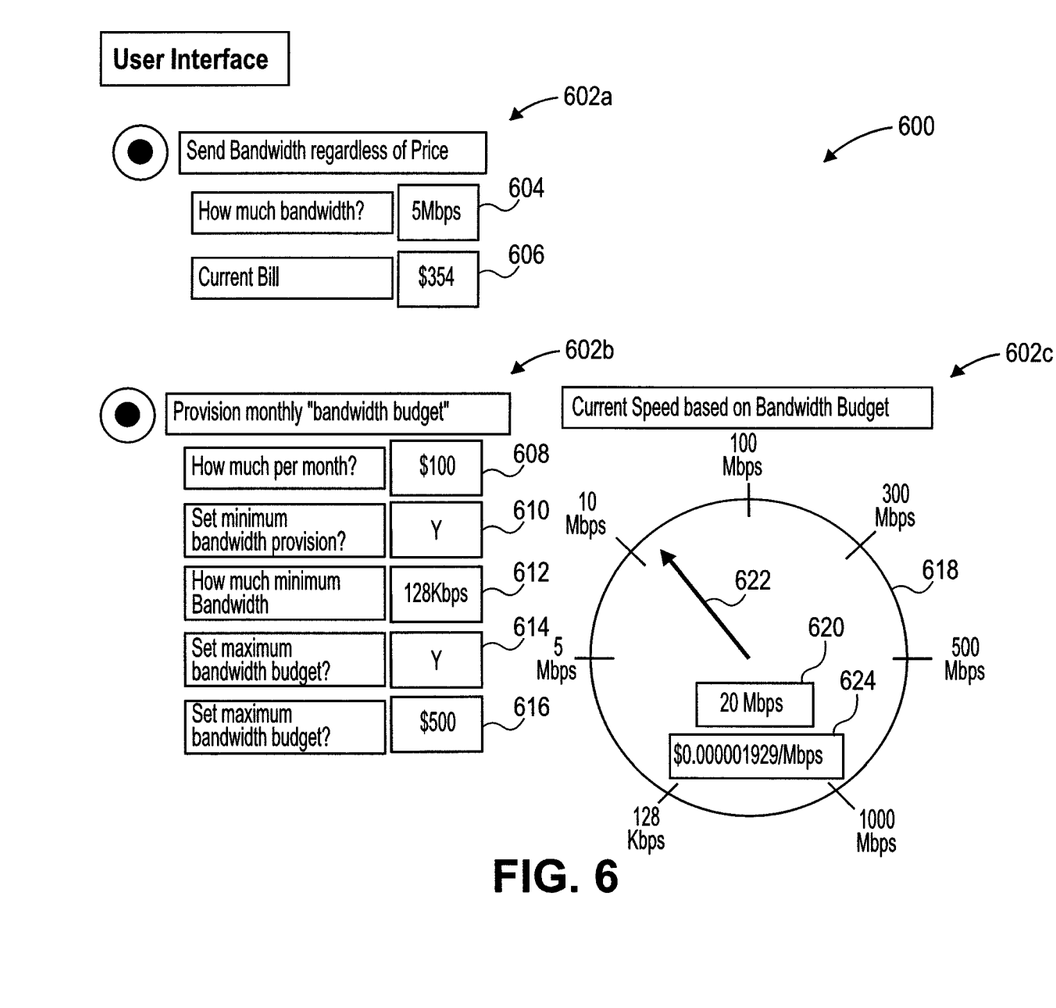
FIG. 6 is an illustration of an illustrative set of controls for a user for establishing and monitoring communications over a communications network that utilizes bandwidth occupancy in establishing a price for communicating over the communications network.

With regard to FIG. 6, an illustration of an illustrative graphical user interface 600 is provided. A graphical user interface 600 may include a number of different sections, including section 602a, 602b and 602c. Sections 602a and 602b are each selectable by a user to enable the user to selectively determine how communications over a communications network are to be conducted based on supply and demand of bandwidth occupancy that affects price being paid by the user. Section 602a enables the user to select that the user is going to communicate over the communications network regardless of price and to enable the user to indicate how much bandwidth is to be guaranteed as a minimum. In addition, a current bill for the user to perform communications over the communications network may be displayed. In one embodiment, the current bill is cumulative during a monthly period or billing cycle to enable the user to determine how much network access currently and/or cumulatively costs.

Section 602b enables a user to select to provision a monthly bandwidth budget. The user is able to enter a maximum amount of dollars per month to be spent for communicating over the communications network in a data field 608. The user may select whether or not to set a minimum bandwidth provision for communications over the communications network by entering a "Y" in data field 610, and if the user selects to have a minimum bandwidth provision, then the user may enter a minimum bandwidth provision by entering a value in the data field 612. The user may also elect to set a maximum bandwidth budget by entering a "Y" in data field 614, and, if so, then a maximum bandwidth budget may be set by the user by entering an amount in data field 616. It should be understood that each of the data fields 608-616 may be configured as selectable pull-down menus or utilize other graphical user elements as understood in the art for the user to select options and values for each of the bandwidth provisioning parameters.

Section 602c may include a current bandwidth speed dial 618 that includes a "digital" indicator 620 and "analog" indicator 622 that represent the amount of bandwidth currently being utilized by the user. In addition, another indicator 624 may show a current price for a megabit per second (Mbps) for communicating data over a communications network. An example of pricing may be given by the following example: if $100/month bandwidth budget is use and there are 2,592,000 seconds in an average month, the user has $0.00003858 to spend on bandwidth every second of the month ($100/2,592,000), so the current price of bandwidth would have to be $0.000001929/Mbps for a current communication speed of 20 Mpbs, as shown by the current bandwidth speed dial 618. It should be understood that alternative representations of indicating to the user the amount of bandwidth currently being utilized by the user and current costs for using bandwidth on or accessing the communications network. Different colors, popup windows, or other messaging may be utilized in section 602c to notify the user when costs are increasing at or near budgetary desires as established by the user. The user interface may be executed by software operating on a server, such as server 106 (FIG. 1), of the user and accessible by a computing device, such as computing device 104a, that interfaces with the server 106.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for establishing a price for communicating over a communications network, said system comprising:
   a plurality of network nodes configured to communicate over the communications network, each of said network nodes further configured to determine bandwidth occupancy along each traffic path to which each of said network nodes are connected, wherein the plurality of network nodes are physical devices comprising of hardware components; and
   a primary network node configured to:
   initiate a bandwidth occupancy query message to a first network node along a traffic path to which a user is communicating, wherein the traffic path includes the first network node and a last network node with intermediate network nodes along the traffic path between the first network node and the last network node, the first network node updating the bandwidth occupancy query message with current bandwidth occupancy at the first network node and transmits the updated bandwidth occupancy query message to a next intermediary network node along the traffic path, the next intermediary network node updates the bandwidth occupancy query message with current bandwidth occupancy at the next intermediary network node and transmits the updated bandwidth occupancy query message to a next node along the traffic path, and responsive to the next node being the last network node, updating the bandwidth occupancy query message with current bandwidth occupancy at the last network node and transmitting the updated bandwidth occupancy query message back to the primary network node;
   determine a highest bandwidth occupancy of said network nodes along the traffic path, wherein the highest bandwidth occupancy along the traffic path is a highest current bandwidth occupancy selected among the current bandwidth occupancies reported at each of the network nodes along the traffic path;
   compute a current price for a user communicating over the traffic path based on the highest bandwidth occupancy; and
   notify the user of the current price for communicating over the traffic path.

2. The system according to claim 1, wherein each node along the traffic path is configured to determine bandwidth occupancy in response to receiving the bandwidth occupancy request message.

3. The system according to claim 2, wherein each node along the traffic path is configured to forward the bandwidth occupancy request message to a successive network node along the traffic path.

4. The system according to claim 1, wherein said primary network node is further configured to update a bandwidth occupancy table with the highest bandwidth occupancy associated with the traffic path.

5. The system according to claim 1, wherein said primary network node is further configured to:
   determine each network node along the traffic path;
   communicate a bandwidth occupancy query message to each of the network nodes along the traffic path; and
   update a bandwidth occupancy table for the traffic path with a highest bandwidth occupancy at each node along the traffic path.

6. The system according to claim 1, wherein said primary network node is further configured to communicate the highest bandwidth occupancy to each of the network nodes along the traffic path.

7. The system according to claim 1, wherein bandwidth occupancy is defined as a percentage of bandwidth capacity at a network node.

8. The system according to claim 1, further comprising an accounting server in communication with said primary network node, and configured to receive costs for the user communicating over the communications network.

9. The system according to claim 8, wherein said network node is further configured to accumulate current prices and bandwidth utilization by the user to calculate costs incurred by the user for communicating over the communications network.

10. The system according to claim 1, further comprising customer premise equipment configured to determine when the highest bandwidth occupancy along the traffic path is over a predetermined bandwidth occupancy threshold level and, in response to determining that the highest bandwidth occupancy along the traffic path is over the predetermined occupancy threshold level, alter communications from the customer premise equipment with the network nodes along the traffic path on the communications network.

11. A method for establishing a price for communicating over a communications network, said method comprising:
   initiating, using a processor of a system, a bandwidth occupancy query message to a first network node along a traffic path to which a user is communicating, wherein the traffic path includes the first network node and a last network node with intermediate network nodes along the traffic path between the first network node and the last network node;
   updating, by the first network node, the bandwidth occupancy query message with current bandwidth occupancy at the first network node;
   transmitting, by the first network node, the updated bandwidth occupancy query message to a next intermediary network node along the traffic path;
   updating, by the next intermediary network node, the bandwidth occupancy query message with current bandwidth occupancy at the next intermediary network node;
   transmitting, by the next intermediary network node, the updated bandwidth occupancy query message to a next node along the traffic path;
   responsive to the next node being the last network node, updating the bandwidth occupancy query message with current bandwidth occupancy at the last network node;
   transmitting, by the last network node, the updated bandwidth occupancy query message back to the system;
   determining, using the processor of the system, a highest bandwidth occupancy of the network nodes along the traffic path;
   computing, using the processor of the system, a current price for a user communicating over the traffic path based on the highest bandwidth occupancy; and
   notifying, using the processor of the system, the user of the current price for communicating over the traffic path.

12. The method according to claim 11, further comprising determining bandwidth occupancy in response to receiving the bandwidth occupancy request message.

13. The method according to claim 12, further comprising forwarding the bandwidth occupancy request message to a successive network node along the traffic path.

14. The method according to claim 11, further comprising updating a bandwidth occupancy table with the highest bandwidth occupancy associated with the traffic path.

15. The method according to claim 11, further comprising:
   determining each network node along the traffic path;
   communicating a bandwidth occupancy query message to each of the network nodes along the traffic path; and
   updating a bandwidth occupancy table for the traffic path with a highest bandwidth occupancy at each node along the traffic path.

16. The method according to claim 11, further comprising communicating the highest bandwidth occupancy to each of the network nodes along the traffic path.

17. The method according to claim 11, wherein bandwidth occupancy is defined as a percentage of bandwidth capacity at a network node.

18. The method according to claim 11, further comprising accumulating costs for the user for communicating over the communications network.

19. The method according to claim 18, further comprising accumulating current prices and bandwidth utilization by the user to calculate costs incurred by the user for communicating over the communications network.

20. The method according to claim 11, further comprising:
   determining when the highest bandwidth occupancy along the traffic path is over a predetermined bandwidth occupancy threshold level and, in response to determining that the highest bandwidth occupancy along the traffic path is over the predetermined occupancy threshold level; and
   altering communications with the network nodes along the traffic path on the communications network.

* * * * *